United States Patent

Ajimu et al.

[11] Patent Number: 5,841,519
[45] Date of Patent: Nov. 24, 1998

[54] PRINTER CONTROL FILM, FILM CARRIER, AND METHOD FOR MANAGING A PRINTER CONTROL FILM

[75] Inventors: Shuji Ajimu; Mitsukazu Hosoya, both of Kanagawa, Japan

[73] Assignee: Fuji Photo Film Co., Ltd., Kanagawa, Japan

[21] Appl. No.: 670,933

[22] Filed: Jun. 28, 1996

[30] Foreign Application Priority Data

Jun. 29, 1995 [JP] Japan .................................. 7-164087

[51] Int. Cl.⁶ ............................ G03B 27/72; G03B 27/52
[52] U.S. Cl. ................................. 355/40; 355/35
[58] Field of Search .............................. 355/39, 40, 41, 355/42, 43, 35; 396/563, 578

[56] References Cited

U.S. PATENT DOCUMENTS

| | | | |
|---|---|---|---|
| 5,083,154 | 1/1992 | Terashita et al. | 355/68 |
| 5,223,892 | 6/1993 | Ikenoue et al. | 355/77 |
| 5,262,821 | 11/1993 | Hosoya | 355/35 |
| 5,438,389 | 8/1995 | Kito et al. | 355/38 |
| 5,555,313 | 9/1996 | Zheng et al. | 382/112 |
| 5,669,031 | 9/1997 | Ishikawa et al. | 396/569 |
| 5,703,673 | 12/1997 | Tokuda | 355/40 |

*Primary Examiner*—R. L. Moses
*Assistant Examiner*—Shival Virmani
*Attorney, Agent, or Firm*—Sughrue, Mion, Zinn, Macpeak & Seas, PLLC

[57] ABSTRACT

A printer control film and a film carrier allow proper management of the printer control film. When a Bull's-eye serving as the printer control film is inserted into the film carrier, magnetic information recorded on the Bull's-eye is read out. When it is judged based on the read out information that the Bull's-eye is an unused one, a start time of use is recorded on the Bull's-eye together with an apparatus ID. When it is judged that the Bull's-eye was used before, the apparatus ID, the used period, the number of times of use, and the like are read out from the Bull's-eye. When it is judged based on these data that the Bull's-eye carries proper images necessary for a conditioning operation, the number of times of use is updated. Subsequently, images recorded on the Bull's-eye are printed onto a printing paper.

7 Claims, 7 Drawing Sheets

PRINTER CONTROL FILM, FILM CARRIER, AND METHOD FOR MANAGING A PRINTER CONTROL FILM

BACKGROUND OF THE INVENTION

1. Field of the Invention:

The present invention relates to a printer control film used for setting conditions of exposure for printing onto a printing paper, images recorded on a photographic film, and to a film carrier onto which such a printer control film is loaded. The present invention also relates to a method for managing such a printer control film.

2. Description of the Related Art:

In a photographic printer, in order to obtain color prints each having an optimum density and tone, the processing performance of each processing solution such as developing solution, is strictly controlled, and for each printing apparatus conditions of exposure are set for printing onto a printing paper (color paper) images recorded on a negative film. Such exposure conditions are obtained from standard exposure conditions which provide proper prints through exposure when each image has a standard density. That is, the standard exposure conditions are compensated so as to obtain an optimum density and color balance regardless of variations in image density caused by overexposure or underexposure.

The standard exposure conditions for providing color prints each having an optimum density and tone must be correct when a color paper having a different emulsion number is used, when a printing lamp is replaced, when developing solution is changed, when colors of photographs are changed due to a turning of the seasons, or the like. Further, when the exposure conditions vary due to dirt, degradation, or replacement of an optical system including a light adjusting filter, a lamp, a reflector, etc., the standard exposure conditions and compensation values therefor must be corrected.

When such standard exposure conditions or their compensation values are set or corrected, a developed film which is obtained by photographing a predetermined object under preset exposure conditions (printer control film) is used, and a so called "conditioning operation" is performed using the printer control film. In the conditioning operation, exposure conditions are set or corrected such that an image recorded on the printer control film is printed in a desired state. The printer control film used for conditioning is a so-called "Bull's-eye" having a circular image at the center of a frame, which is formed by photographing a gray object. The Bull's-eye is loaded onto a film carrier, in the same manner as in the case of ordinary photographic film, so as to carry out exposure for printing onto a printing paper the image recorded on the Bull's-eye. Through this process, a photographic print is obtained. The density of the image on the photographic print is measured and compared with that of an image on a previously prepared standard print (reference print). Based on the results of the comparison, the exposure conditions are set.

However, when the image recorded on the Bull's-eye discolors or dirty, the conditioning operation becomes impossible to be carried out accurately even if the discoloration or dirt is slight. Since images on a plurality of Bull's-eyes differ slightly from one another, performing the conditioning operation must be avoided using a Bull's-eye for a different photographic printer. Management for such a Bull's-eye is performed using a label which is attached to part of the film and on which is displayed a start time of use, a time limit for use, a photographic printer to be conditioned, and the like. Therefore, it is difficult to perform the management accurately, and there is a large possibility of bringing about problems of erroneous use of a Bull's-eye which has passed its time limit for use or which has reached the usable limit (a predetermined number of times of use), or erroneous use of a Bull's-eye used for conditioning another printer.

SUMMARY OF THE INVENTION

The present invention has been accomplished in view of the above-mentioned problems, and an object of the present invention is to provide a printer control film, the management of which is greatly facilitated.

Another object of the present invention is to provide a film carrier which allows proper management of a printer control film.

Still another object of the present invention is to provide a method for managing a printer control film.

According to a first aspect of the present invention, there is provided a printer control film used for setting exposure conditions during exposure, for printing onto a printing paper, images of a photographic film loaded onto a film carrier of a photographic printer. The printer control film comprises an image recording region in which an image is recorded which has been formed through exposure under predetermined exposure conditions, a perforation indicating the position of the image in the image recording region, and a magnetic recording region into which are recorded, at least information specifying a photographic printer for which the film is used and information regarding use, including a start time of use and the number of times of use, as well as exposure conditions for the image.

According to a second aspect of the present invention, there is provided a film carrier which comprises an image position detecting section for detecting a perforation indicating the position of each of images recorded in an image recording region of a photographic film, a magnetic head section capable of reading and recording magnetic information from and into a magnetic recording region of the photographic film, and a control section. When a printer control film used for setting conditions during exposure, for printing onto a printing paper images of a photographic film, is loaded onto the film carrier in an unused state, the control section records into a magnetic recording region of the printer control film, at least information specifying a photographic printer and a start time of use, as information regarding use. Whenever the printer control film is loaded onto the film carrier, the control section cumulates the number of times of use and records it into the magnetic recording region of the printer control film, as the information regarding use, and the control section then positions the images at a predetermined position successively, after reading out the information regarding use.

According to a third aspect of the present invention, based on the information regarding use, the controller of the film carrier according to the second aspect, judges whether the printer control film has reached the end of a predetermined serviceable period or a predetermined number of times of use.

According to a fourth aspect of the present invention, there is provided a method for managing a printer control film. In the method, a magnetic recording region is provided on a printer control film used for setting conditions during exposure, for printing onto a printing paper images recorded on a photographic film loaded onto a film carrier, and a magnetic head section is provided which can read and record magnetic information from and into the magnetic recording region of the printer control film. In the method, a control section is further provided so as to control reading of the magnetic information, recording of magnetic information, positioning of each image at a predetermined position, and loading and unloading of the printer control film. Under the control of the control section and through the magnetic head section, information regarding use, including at least information specifying a photographic printer and a start time of use, is recorded into the magnetic recording region, when the printer control film is loaded onto the film carrier in an unused state. Under the control of the control section, the number of times of use is cumulated and information regarding use, including the cumulated number of times of use is recorded into the magnetic recording region through the magnetic head section, whenever the printer control film is loaded onto the film carrier. By this method, the printer control film is managed based on the information regarding use.

On the printer control film according to the present invention, images are recorded which have been formed through exposure under various exposure conditions, and exposure conditions of each image are recorded into the magnetic recording region. Therefore, it is possible not only to set exposure conditions based on the density of each recorded image and but also to carry out exposure while determining exposure conditions of each image based on the magnetic information.

Since the state of use of the printer control film is recorded in the magnetic recording region, management of the printer control film can be performed easily and accurately, based on the start time of use, serviceable period, the number of times of use, etc. This prevents the use of a control film which has possibly discolored or deteriorated.

In the second aspect of the present invention, the information regarding use of a printer control film is recorded into the magnetic recording region of the printer control film. For example, when an unused printer control film is loaded onto a film carrier so as to set exposure conditions of a photographic printer, a start time of use, an apparatus ID specifying the photographic printer, and the like are recorded as the information regarding use. Also, whenever the printer control film is used, the number of times of use, etc., are recorded successively into the magnetic recording region.

By reading out the information regarding use of the printer control film recorded in the magnetic recording region, it is possible to clearly grasp the state of use of the printer control film. Accordingly, it becomes possible to prevent the conditioning operation from being performed using a printer control film when, based on the apparatus ID, it is judged that the printer control film is for another photographic printer.

By using the film carrier according to the present invention, it becomes possible to perform proper management of a printer control film, even in a photographic printer which is not provided with a function of recording and reading magnetic information into and from the magnetic recording region of the printer control film.

When exposure conditions are set for a plurality of photographic printers using a single printer control film, apparatus IDs of the plurality of photographic printers may be recorded so as to prevent the printer control film from being used in photographic printers other than the photographic printers whose apparatus IDs are recorded in the magnetic recording region.

In the third aspect of the present invention, whenever a conditioning operation is performed for setting exposure conditions through use of a printer control film, it is judged whether the printer control film is in a usable range, based on data regarding the start time of use and the number of times of use, which are recorded on the printer control film. With this operation, it becomes possible to prevent the exposure conditions from being set using a printer control film whose images have probably discolored due to use over a prolonged period of time or which has been damaged due to a great number of times of use. Therefore, the exposure conditions of the photographic printer can be maintained appropriately, which makes it possible to produce photographic prints of good finish through exposure of constant quality.

When a photographic system is used in which a photographic film is wound into a cartridge for storage, the printer control film of the present invention is preferably wound into a cartridge for storage. This prevents the control film from being damaged or from being affected by external light, which would otherwise cause discoloration, during storage.

The above and other objects, features, and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF PREFERRED EMBODIMENT

Figure 1:
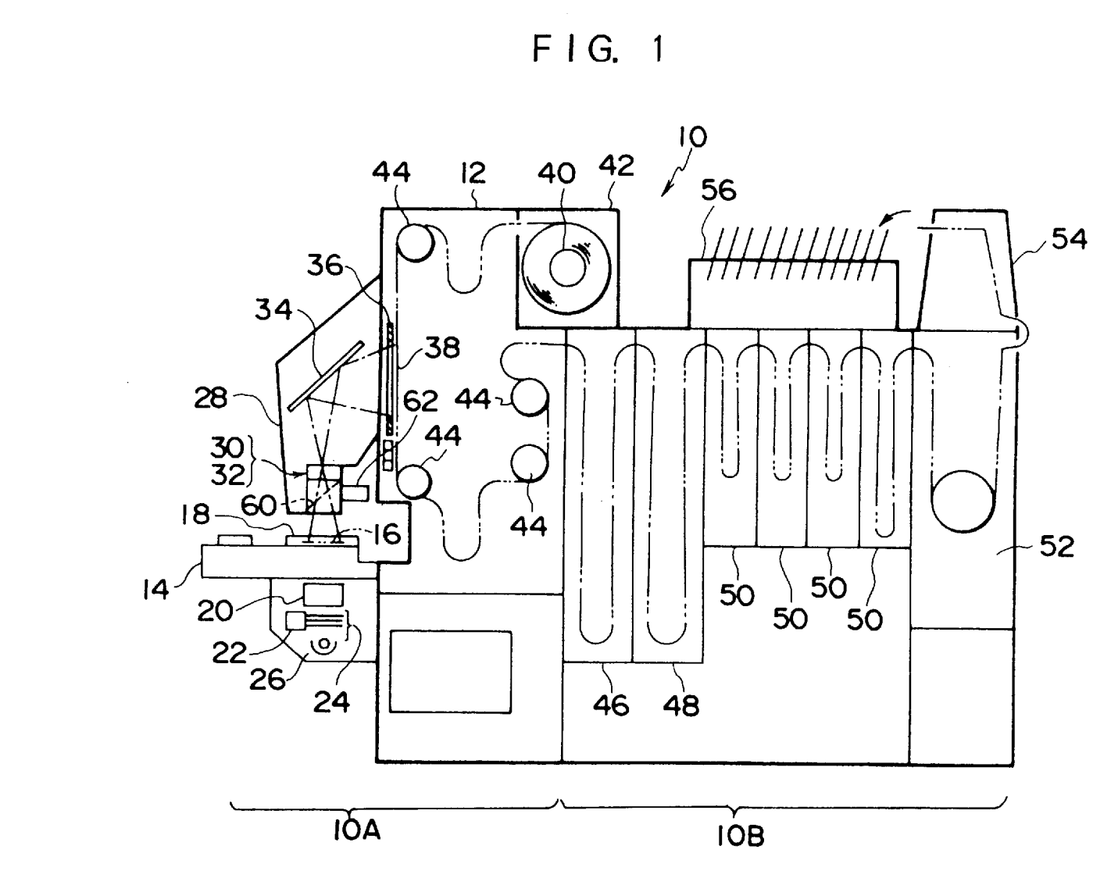
FIG. 1 is a schematic view showing the structure of a printer processor equipped with a photographic printer.

FIG. 1 schematically shows the structure of a printer processor 10. In the printer processor 10, a printer section 10A serving as a photographic printer is integrated with a processor section 10B, and both sections are covered by a casing 12.

The printer section 10A is provided with a worktable 14 projecting from the casing 12. On the upper surface of the worktable 14 is provided a film carrier 18 onto which a negative film 16 is set.

On the lower side of the worktable 14 in FIG. 1 are disposed a diffusion tube 20, a cut filter 24 equipped with a driver 22, and a light source 26. The filter 24 includes color filters of yellow (Y), magenta (M) and cyan (C) and compensates the balance between red (R), green (G) and blue (B) components of light irradiated from the light source 26. In an optical section 28 located on the upper side of the worktable 14 in FIG. 1 are disposed a printing lens 30, a black shutter 32, and a reflection mirror 34.

Light irradiated from the light source 26 passes through the diffusion tube 20 and irradiates the negative film 16 set on the film carrier 18. After passing through the negative film 16, the light passes through the printing lens 30 and reaches the reflection mirror 34 at which the direction of the light (direction of the optical axis) is changed by about 90°. On one side of the reflection mirror 34 is disposed a variable print mask 36, and the light reflected by the reflection mirror 34 is irradiated into the opening of the variable print mask 36.

At the top of the casing 12 is disposed a paper magazine 42, which stores therein a printing paper 38 wound in layers around a reel 40. Further, a plurality of rollers 44 are disposed within the casing 12 so as to guide the printing paper 38 pulled out of the paper magazine 42. The running direction of the printing paper 38 is changed at one side of the reflection mirror 34 so that the printing paper 38 reaches the variable print mask 36. When light passing through the negative film 16 is irradiated into a predetermined region of the printing paper 38 surrounded by the variable print mask 36, an image is printed onto the printing paper 38.

A half mirror 60 is provided between the black shutter 32 and the film carrier 18, and adjacent to the half mirror 60 are disposed density sensors 62 for detecting the density of the image for each of red, green and blue. Part of the light passing through an image recorded on the negative film is reflected by the half mirror 60, so that this part of the light reaches the density sensor 62, where the density of the image is measured. In the printer section 10A, exposure conditions such as exposure time are set in accordance with the density of the image thus measured.

After the image has been printed, the printing paper 38 is transported into the processor section 10B. In the processor section 10B, there are provided a color developing tank 46, a bleaching/fixing tank 48, and a plurality of rinsing tanks 50. The printing paper 38 is passed sequentially through a color developing solution, a bleaching/fixing solution, and a rinse solution, which are stored in the above-mentioned tanks, respectively. Subsequently, the printing paper 38 is transported to a drying section 52, where drying air such as hot air is blown onto the printing paper 38, thereby performing drying. After completion of the drying process, the printing paper 38 is transported to a cutter section 54 disposed above the drying section 52. In the cutter section 54, the printing paper 38 is cut image frame by image frame, and is discharged from the casing 12. Pieces of the printing paper 38 discharged from the casing 12 are sorted for each negative film 16 and are accumulated in a sorter section 56.

Figure 2:
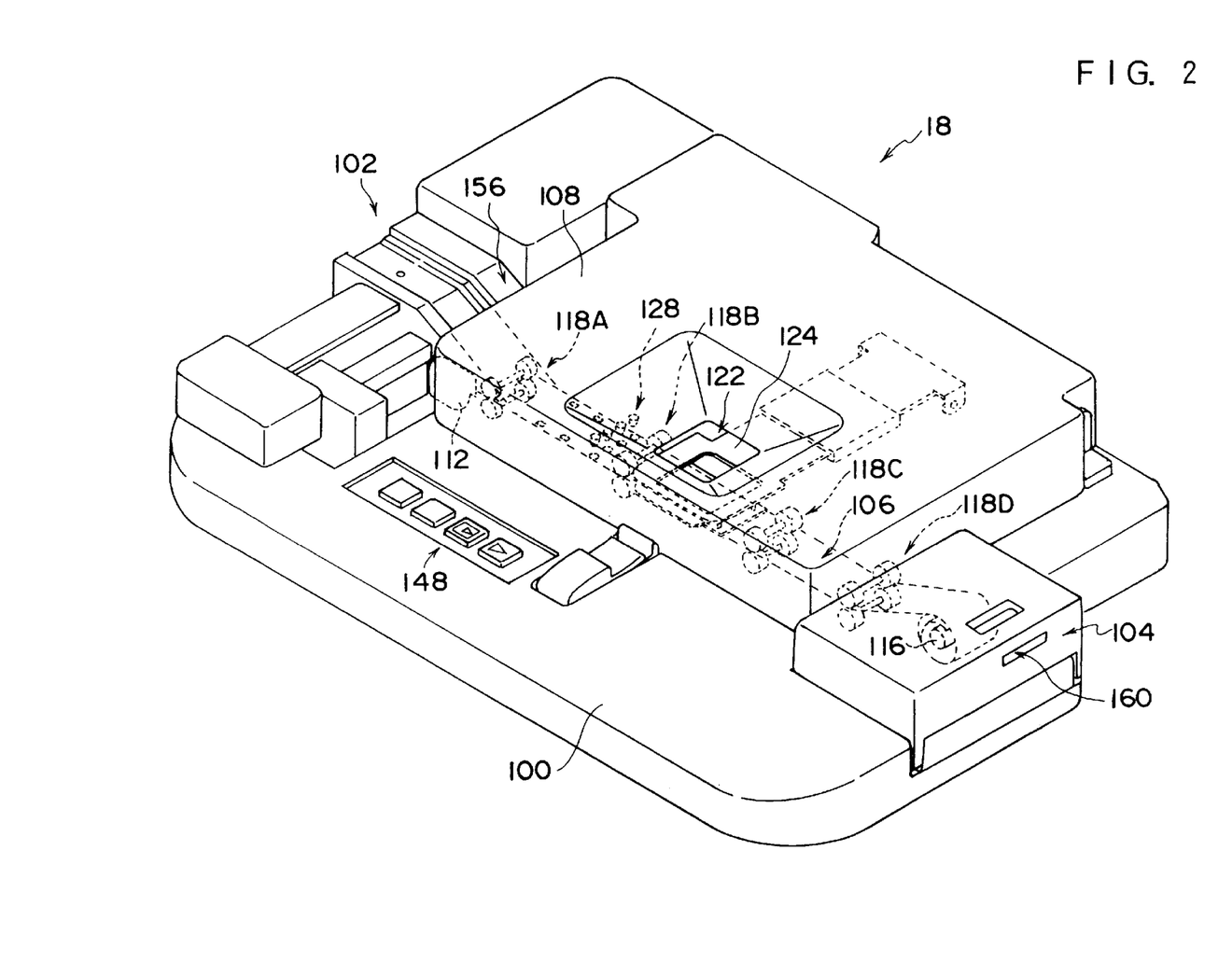
FIG. 2 is a schematic perspective view of a film carrier according to an embodiment of the present invention.
Figure 3:
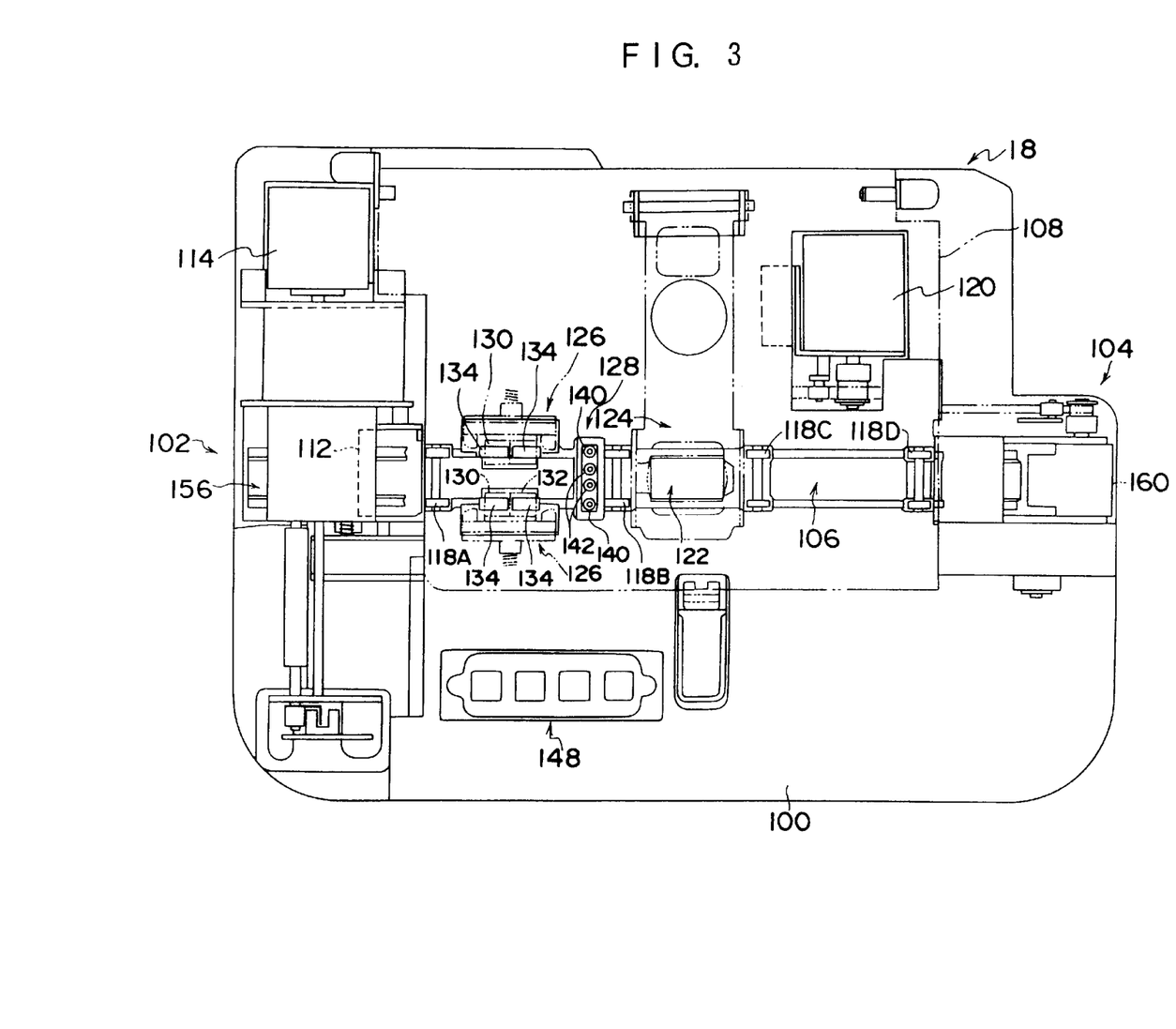
FIG. 3 is a schematic plan view of the base of the film carrier shown in FIG. 2.
Figure 4:
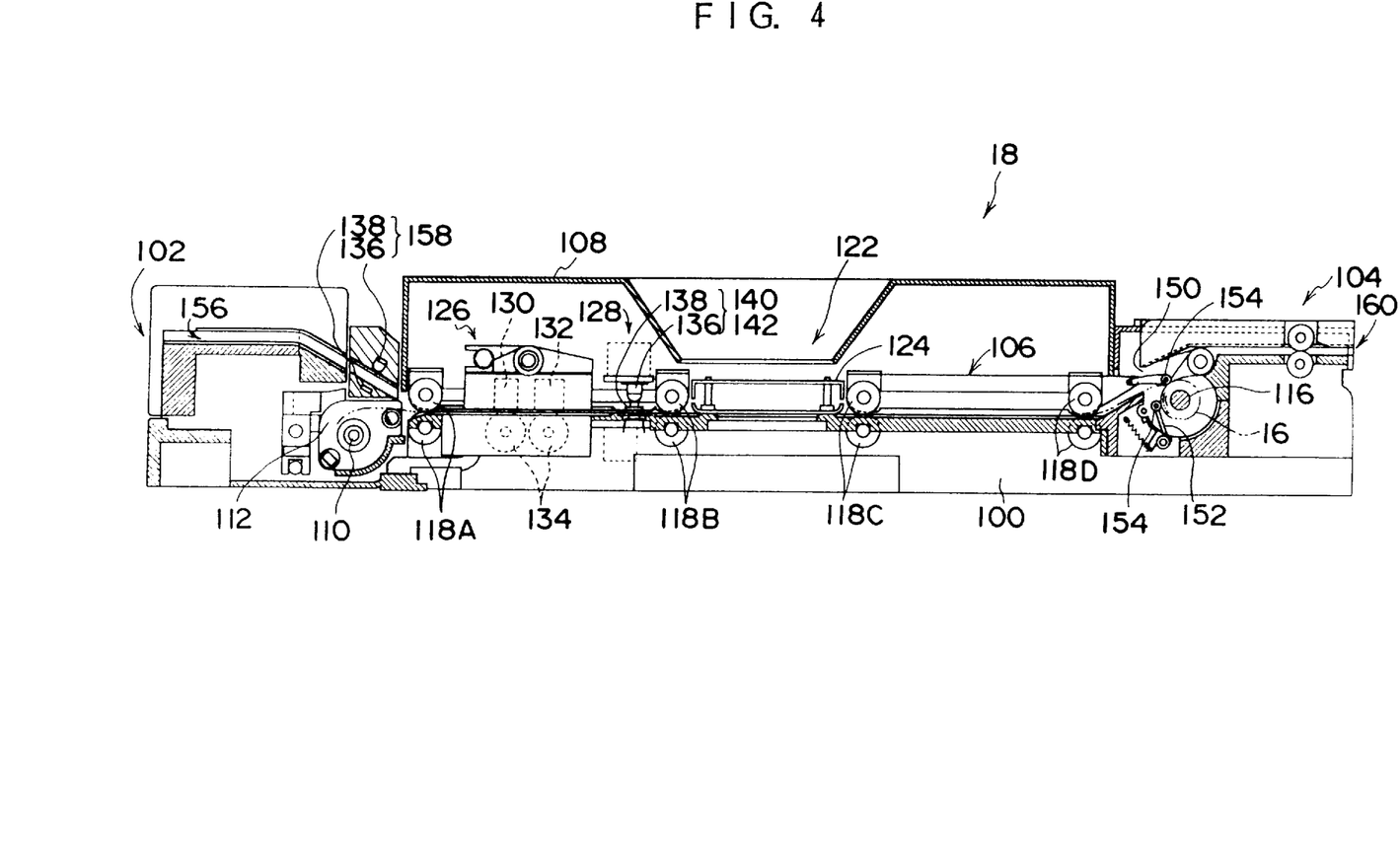
FIG. 4 is a schematic cross section of the film carrier along the transport direction of a negative film.

FIGS. 2–4 show the film carrier 18 mounted on the worktable 14. The film carrier 18 has a base 100, on which a cartridge loading section 102 and a film receiving section 104 are provided. Further, a transport path 106 is formed on the upper surface of the base 100 such that it extends from the cartridge loading section 102 to the film receiving section 104. The transport path 106 is typically covered by a cover 108 disposed on the base 100.

Onto the cartridge loading section 102 is loaded a cartridge 112, which houses a negative film 16 wound around a spool shaft 110. When the spool shaft 110 of the cartridge 112 loaded onto the cartridge loading section 102 is rotated by a motor 114 (see FIG. 3), the negative film 16 is fed out to the transport path 106. When the motor 114 is rotated in the reverse direction, the fed out negative film 16 is wound by the spool 110 for storage in the cartridge 112.

Along the transport path 106, there are disposed paired feed rollers 118A–118D which are supported by the base 100 and the cover 108. The feed rollers 118A–118D are driven by a motor 120 (see FIG. 3). A portion of the negative film 16 outside the cartridge 112 is held by the feed rollers 118A–118D and is transported in one direction such that the negative film 16 is further pulled out of the cartridge 112, or in the opposite direction such that the negative film 16 is fed back into the cartridge 112. In the film receiving section 104, the negative film 16 fed via the transport path 106 is guided by guides 150 and 152 so that the negative film 16 approaches the peripheral surface of a take-up shaft 116. Guide rollers 154 provided at the tips of the guides 150 and 152 cooperate with the take-up shaft 116 so as to hold the negative film 16 therebetween and wind it around the take-up shaft 116. By this operation, the negative film 16 is temporarily stored in the film receiving section 104. Therefore, even when the negative film 16 pulled out of the cartridge 112 has a curl, the negative film 16 is prevented from winding itself around, which would damage the negative film 16.

In the cartridge loading section 102, before feeding out the negative film 16 into the transport path 106, it is judged whether the negative film 16 contained in the cartridge 112 has been subjected to development. This prevents the negative film 16 from being pulled out erroneously when the negative film 16 is an undeveloped one.

In the film carrier 18, an opening 122 for printing is formed at the central portion of the transport path 106. Each frame of the negative film 16 is positioned successively so as to face the opening 122. The light from the light source 26 propagating from the lower side of the base 100 passes through a frame of the negative film 16 positioned at the opening 122 and reaches the optical section 28. A negative film pressing plate 124 is disposed between the base 100 and the cover 108. After a certain frame of the negative film 16 is positioned to face the opening 122, the negative film pressing plate 124 presses uniformly an area surrounding an image of the frame against the base 100, thereby preventing generation of distortion in an image focused on the printing paper 38.

Moreover, magnetic head units 126 and a sensor unit 128 are disposed on the film carrier 18. Each of the magnetic head units 126 is provided with a recording head 130 for writing of magnetic information and a reading head 132 for reading of magnetic information. The magnetic head units 126 are fixed to the cover 108 such that they are disposed at transverse direction ends of the transport path 106 so as to face one another. Backup rollers 134, which face the recording head 130 and the reading head 132, respectively, are disposed on the base 100. Accordingly, each of magnetic recording layers formed at both transverse direction ends of the negative film 16 transported along the transport path 106 is caused to come in close contact with the recording heads 130 and the reading heads 132.

The sensor section 128 is provided with a plurality of sensors 140 and 142, each consisting of a light emitting device 136 and a light receiving device 138. At each sensor 140, 142, one of the light emitting device 136 and the light receiving device 138 is disposed on the cover 108, whereas the other of the light emitting device 136 and the light receiving device 138 is disposed on the base 100.

The sensors 140 are disposed at both transverse direction ends of the transport path 106 so as to face one another. The sensors 140 detect perforations formed in the negative film 16 and also read out optical information in the form of a bar code, such as a DX code. The sensors 142 are arranged in the widthwise direction of the transport path 106 so as to detect images recorded on the negative film 16 passing through the transport path 106.

Figure 5:
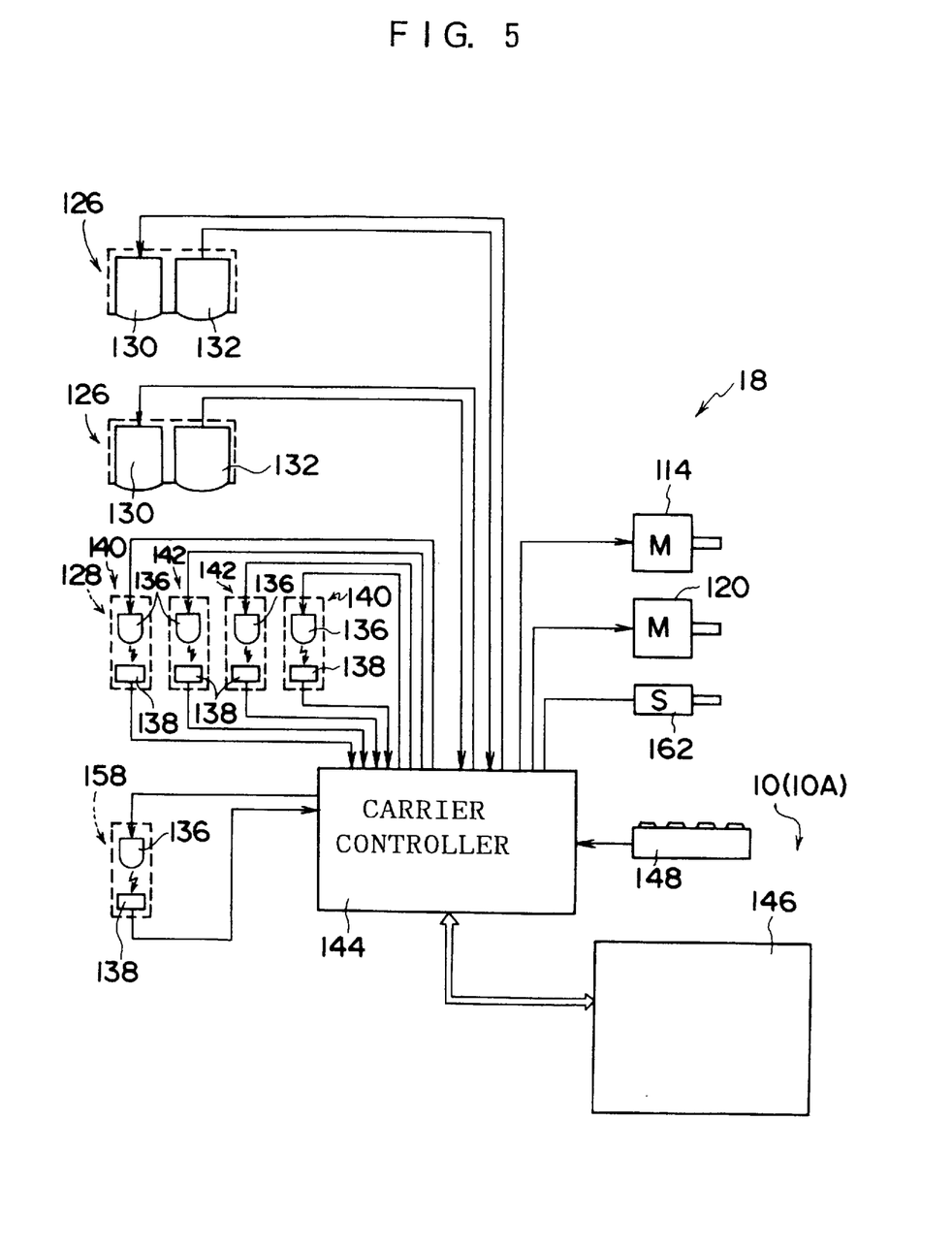
FIG. 5 is a block diagram schematically showing the control section of the film carrier.

As shown in FIG. 5, the film carrier 18 is provided with a carrier controller 144. The carrier controller 144 includes an unillustrated micro computer consisting of a CPU, a ROM, a RAM, etc. To the carrier controller 144 is connected various sensors, drive components, etc. of the film carrier 18. In detail, in addition to the recording heads 130 and the reading heads 132 of the magnetic head units 126, and the light emitting devices 136 and the light receiving devices 138 of the sensors 140 and 142, the motors 114 and 120, an operation switch 148 (see FIG. 2) provided on the base 100, and the like are connected to the carrier controller 144. A printer controller 146 of the printer section 10A is also connected to the carrier controller 144.

When a negative film 16, in which perforations for precisely indicating the position of each image are formed at both transverse direction ends, is loaded onto the film carrier 18, the position of each image can be precisely detected from the perforations. When the negative film 16 is provided, at both transverse direction ends thereof, with magnetic recording layers on which various kinds of information regarding images obtained through photographing or the like are recorded, the information recorded on the magnetic recording layers can be read out. Also, information can be recorded onto the magnetic recording layers.

Each recording head unit 126 is disposed such that when a certain image frame of the negative film 16 is positioned at the opening 122, the recording head 130 is situated between two adjacent image frames located between the certain image frame and the cartridge loading section 102, while the reading head 132 is situated between the recording head 130 and the opening 122. With this arrangement, it is possible to read out magnetic information from the negative film 16 when the negative film 16 is completely pulled out from the cartridge 112, and to record magnetic information on the negative film 16 when the negative film 16 is transported frame by frame while the image in each frame is subjected to exposure.

As shown in FIGS. 2–4, the cartridge loading section 102 is provided with a strip inserting portion 156 so as to insert into the transport path 106 a negative film 16 which is not accommodated in the cartridge 112 and has an arbitrary length (so called "strip film"). At the strip inserting portion 156, a sensor 158 is provided so as to detect passage of the strip negative film 16. Also, a discharge port 160 is formed in the film receiving section 104 so as to directly discharge the strip negative film 16 without taking up it around the take-up shaft 116.

In the film carrier 18, when it is detected by the sensor 158 that the strip negative film 16 is inserted in the strip inserting portion 156, the motor 120 is operated, and the guide 150 in the film receiving section 104 is moved by operating drive means such as a solenoid 162 (see FIG. 5), thereby guiding the strip negative film 16 to the discharge port 160.

In the printer processor 10, the density of an image in each frame of the negative film 16 loaded onto the film carrier 18 is measured so as to set exposure conditions, based on which exposure is performed to print the image onto the printing paper. At this time, the exposure conditions are obtained by compensating standard exposure conditions in accordance with a variation in the density of the image. The standard exposure conditions are such that when an image having a standard density is printed through exposure under standard exposure conditions, a proper print can be obtained. The setting and checking of the standard exposure conditions and the setting of a compensation value corresponding to a variation in the density of each image are performed regularly. This operation is also performed whenever a component of the optical system such as the lamp of the light source 26, the filter 24 is replaced in the printer section 10A, or a process solution is exchanged in the processor section 10B. That is, exposure conditions such as exposure time, and balance among three primary colors (R, G and B) during exposure are set such that the images recorded on the negative film 16 are reproduced as prints each having constant agreeable quality.

Figure 6:
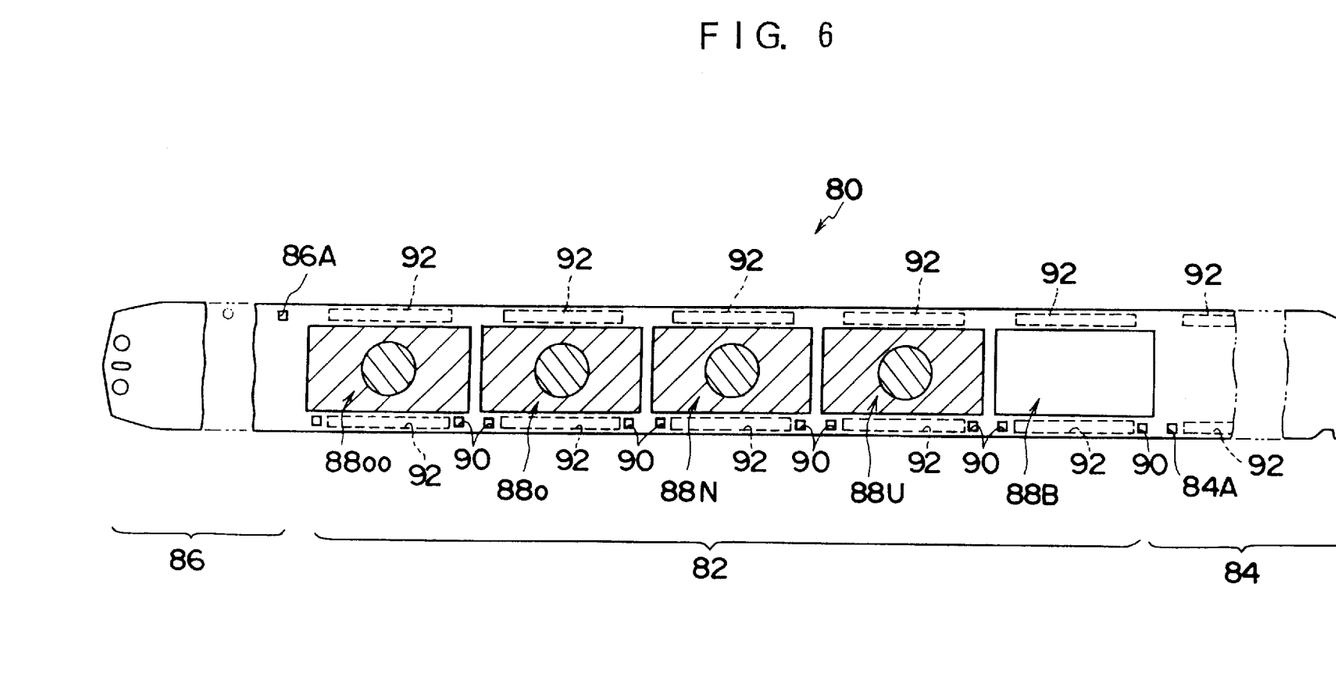
FIG. 6 is a schematic plan view of a Bull's-eye to which the present invention is applied.

FIG. 6 schematically shows the structure of a Bull's-eye 80, which is used as a printer control film for setting and correcting the standard exposure conditions in the printer section 10A of the printer processor 10. As in the negative film 16, the Bull's-eye 80 has an image recording region 82 provided at the longitudinally central portion, and a leader portion 84 and a tail portion 86 are provided such that they sandwich the image recording region 82. The tail portion 86 has a plurality of engagement holes which can be engaged with the spool shaft 110 when the Bull's-eye 80 is stored into the cartridge 112.

The image recording region 82 of the Bull's-eye 80 has an underexposure frame 88U, a standard exposure frame 88N, an overexposure frame 88O, and an ultra overexposure frame 88Oo, as well as unexposed base frames 88B. The underexposure frame 88U, the standard exposure frame 88N, the overexposure frame 88O, and the ultra overexposure frame 88Oo are formed by photographing a circular image having a predetermined color (gray) in the states of underexposure, standard exposure, overexposure and ultra overexposure, respectively.

In the image recording region 82 of the Bull's-eye 80, perforations 90 indicating the positions of the images are formed at the transverse direction end thereof. Further, an around perforation 84A is formed in the leader portion 84 to be adjacent to the image recording region 82, while an around perforation 86A is formed in the tail portion 86 to be adjacent to the image recording region 82. At both transverse direction ends of the Bull's-eye 80, longitudinally extending magnetic tracks 92 are provided on which magnetic information is recorded. The magnetic tracks 92 may be formed by applying a transparent magnetic recording layer over substantially the entire area of one face of the Bull's-eye 80. In this case, only predetermined regions of the magnetic recording layer are used as the magnetic tracks 92.

By detecting the around perforations 84A and 86A and perforations 90 of the Bull's-eye 80 using the sensors 140, the position of each image frame can be accurately grasped. By reading out magnetic information recorded on the magnetic tracks 92, various kinds of information regarding the Bull's-eye 80 can be obtained. Further, the information recorded on the magnetic tracks 92 can be rewritten if needed.

For the Bull's-eye 80, the end of a serviceable period (hereinafter referred to as a "usable time limit") T and a limit on the number of times of use (hereinafter referred to as a "limit use number") N are previously set, taking into consideration damage and discoloration of images recorded on the Bull's-eye 80.

The carrier controller 144 of the film carrier 18 rewrites the number of times of use (use number) n whenever the Bull's-eye 80 is used. When the use number n is zero, i.e., when the Bull's-eye 80 is used for the first time, data of starting the use is recorded together with an apparatus ID of the printer section 10A or the printer processor 10. In the film carrier 18, when the conditioning operation for the printer section 10A is performed using the Bull's-eye 80, information regarding use is read out together with the usable time limit T and the limit use number N so as to compare them, thereby judging whether the conditioning operation can be performed properly using the Bull's-eye 80.

Next, the operation of the present embodiment will be described.

In the printer processor 10, a negative film 16, which has been subjected to development, is loaded onto the film carrier 18 mounted on the worktable 14. After that, a printing operation is performed to print onto the printing paper 38 images recorded on the negative film 16.

In the film carrier 18, the spool shaft 110 of the cartridge 112 is rotated so as to feed the negative film 16 out of the cartridge 112. The portion of the negative film 16 fed out of the cartridge 112 are held by the feed rollers 118A–118D so that the negative film 16 is transported while being pulled out of the cartridge 112. During the transportation, magnetic information recorded on the negative film 16 is read out by the reading head 132. Subsequently, the negative film 16 is received by the film receiving section 104 for temporary storage. After that, the negative film 16 is fed back to the cartridge loading section 102 and is rewound into the cartridge 112, during which the negative film 16 is transported frame by frame so as to successively position the images recorded on the negative film 16 at the opening 122 for printing.

In the printer section 10A of the printer processor 10, when an image is positioned at the opening 122 of the film carrier 18, the density of the image is measured based on the light which is irradiated from the light source 26 and passes through the negative film 16, and exposure conditions are set based on the thus measured density. Opening and closing of the black shutter 32 and other operations are performed in accordance with the exposure conditions so as to print onto the printing paper 38 the images recorded on the negative film 16. In the film carrier 18, magnetic information is recorded onto the magnetic recording layer while the negative film 16 is being rewound.

After the images have been printed onto the printing paper 38 in the above-described manner, the printing paper 38 is transported into the processor section 10B, in which the printing paper 38 undergoes color development, bleaching/fixing, rinsing, and drying process. After that, the printing paper 38 is cut frame by frame to produce photographic prints. The photographic prints are accumulated in the sorter section 56.

When a conditioning operation is performed so as to set standard exposure conditions, which serve as a reference during exposure carried out by the printer section 10A of the printer processor 10, and to set compensation values used for compensating the standard exposure conditions in accordance with the state of exposure (density of each image), the above-described Bull's-eye 16 is loaded onto the film carrier 18 in place of the negative film 16.

Figure 7:
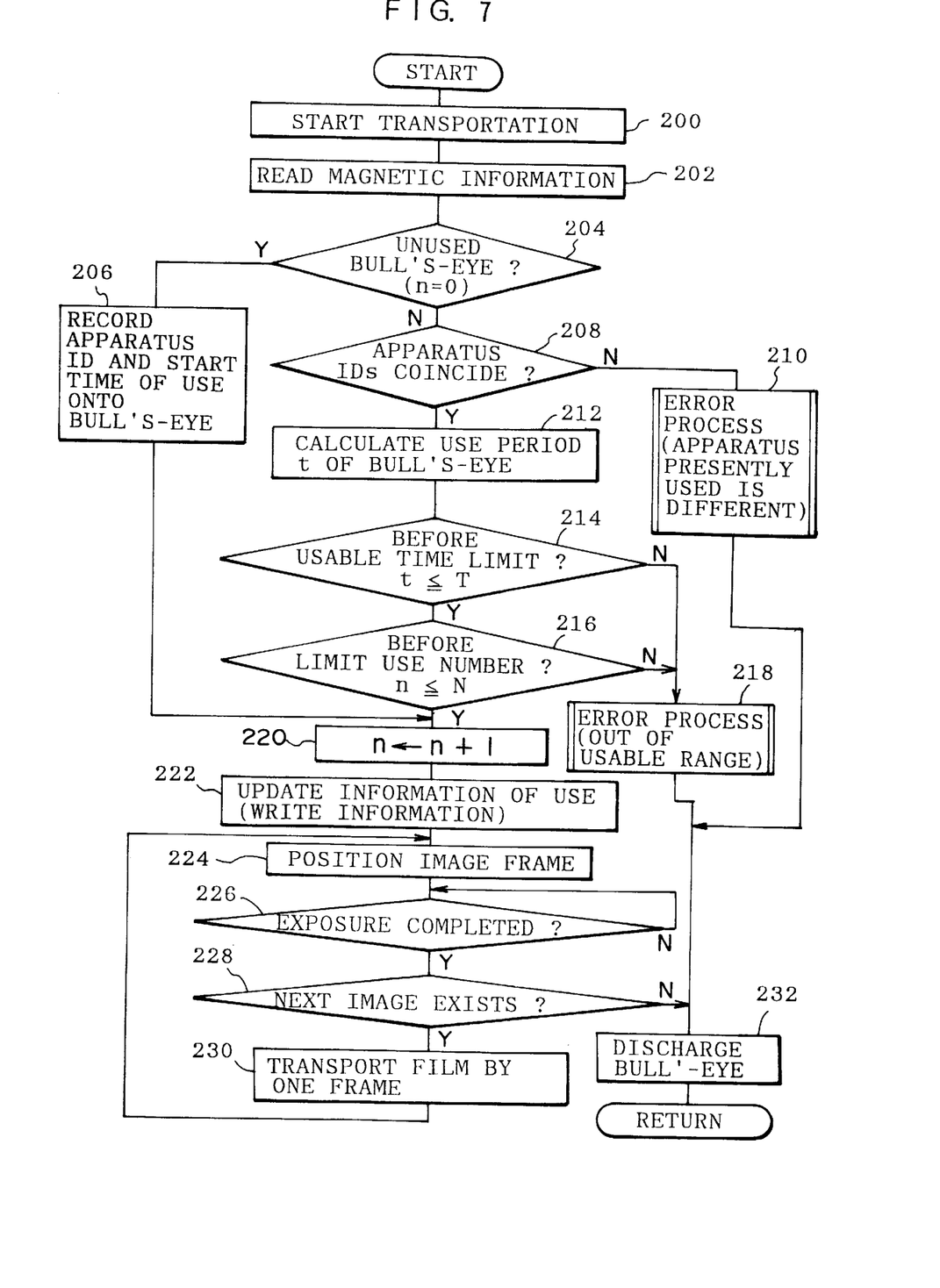
FIG. 7 is a flowchart showing an example of operation of the film carrier.

The flowchart of FIG. 7 shows the operation of the film carrier 18 when photographic prints for conditioning operation are made from the images recorded on the Bull's-eye 80. The operation of the film carrier 18 will now be described with reference to FIG. 7. In the following description, a strip type Bull's-eye 80 is used which is not accommodated in the cartridge 112.

The processing shown by the flowchart is executed when an operator selects an operation mode for carrying out a conditioning operation for the printer processor 10 and the sensor 158 detects that the Bull's-eye 80 has been inserted into the transport path 106 between the base 100 and the cover 108 of the film carrier 18 via the strip insertion portion 156. The processing shown by the flowchart may be started in response to operation of an unillustrated conditioning start switch (which may be provided on the film carrier 18 or the printer processor 10).

In first step 200, the motor 120 is driven to start the transport of the Bull's-eye 80. In step 202, magnetic information recorded on the magnetic tracks 92 is read out by the reading head 132 when the magnetic tracks 92 of the Bull's-eye 80 pass by the magnetic head units 126.

In subsequent step 204, it is judged, based on the magnetic information recorded on the Bull's-eye 80, whether the use number n is zero. That is, it is judged whether the Bull's-eye 80 is an unused Bull's-eye. When the Bull's-eye 80 is an unused one (affirmative judgment, n=0), the processing moves to step 206. In step 206, a start time of use (for example, date, month and year) is recorded onto the magnetic tracks 92 together with the apparatus ID of the print section 10A or the printer processor 10.

When the Bull's-eye 80 is one having already been used before (when a negative judgment is made in step 204), the processing moves to step 208 so as to compare the apparatus ID recorded on the Bull's-eye 80 and the actual apparatus ID of the printer section 10A. When the apparatus IDs differ from each other, the processing moves to step 210 so as to perform error processing. In the error processing, a message is displayed which clearly indicate that the Bull's-eye 80 is for a photographic printer other than the presently used photographic printer, and an alarm or the like is also generated to urge the operator to confirm the error. After that, the conditioning operation using the Bull's-eye 80 is completed (step 232). The alarm and the display of message may be performed on a display section or the like provided on the printer processor 10. Alternatively, such a display or the like may be provided on the film carrier 18.

As described above, when printing for a conditioning operation is performed using the Bull's-eye 80, the apparatus ID, which is recoded on the Bull's-eye 80 as information regarding use, is confirmed. This prevents Bull's-eyes 80 for other photographic printers from being used.

When the apparatus ID recorded on the Bull's-eye 80 coincides with the apparatus ID of the printer section 10A (when an affirmative judgment is made in step 208), it is then judged whether the usable time limit T recorded on the Bull's-eye 80 has been reached. The usable time limit T may be determined based on the date of manufacture of the Bull's-eye 80, or the date on which the Bull's-eye 80 is first taken out of a package having a tight sealing and light shield function. In the latter case, in step 212, the period of time t during which the Bull's-eye 80 is used (hereinafter referred to as "use period") is calculated from the start time of use, and in step 214, it is judged whether the use period t has reached the usable time limit T.

When the use period t has not exceeded the usable time limit T (when an affirmative judgment is made in step 214), the processing moves to step 216 so as to confirm whether the use number n has exceeded the predetermined limit use number N. When the use number n has exceeded the limit use number N, the processing moves to step 218. In step 218, a message is displayed which indicates that the images recorded on the Bull's-eye 80 may degrade (error processing). After that, the printing for conditioning operation is stopped.

When it is judged based on the information regarding use recorded on the Bull's-eye 80 that the Bull's-eye 80 is in a usable range (when affirmative judgments are made in steps 214 and 216), the processing moves to step 220 so as to increment the use number n and updates (writes) the information regarding use recorded on the Bull's-eye 80.

When the confirmation and update of the information regarding use are performed in the above-described manner and it is confirmed that the Bull's-eye 80 is a proper Bull's-eye for the processor 10 (printer section 10A), an exposure operation is started so as to print onto the printing paper 38 the images of the Bull's-eye 80. When the use period t and the use number n of the Bull's-eye 80 approach the usable time limit T and the limit use number N, such a state may be clearly displayed while the exposure operation is continued.

The exposure operation is started when the perforations 90 are detected by the sensors 140 so that an image of the Bull's-eye 80 is accurately positioned at the opening 122 for printing (step 224). In the printer section 10A, the density of the image is measured by the density sensor 62 based on the light passing through the image positioned at the opening 122, and exposure conditions are set based on the thus measured density. After that, the images are printed onto the printing paper 38. When it is confirmed in next step 226 that printing of the image of one frame has been completed, it is judged in step 228 whether a subsequent image is present. When a subsequent image is present (when an affirmative judgment is made in step 228), the processing moves the step 230 so as to transport the Bull's-eye 80 by an amount corresponding to the length of a frame, so that the next frame is positioned at the opening 122. The above-described operation is performed for each of the base frames 88B, the underexposure frame 88U, the standard exposure frame 88N, the overexposure frame 88O, and the ultra overexposure frame 88Oo, thereby making photographic prints for conditioning.

When it is confirmed that all the images of the Bull's-eye 80 have been printed on the printing paper 38 (when a negative judgment is made in step 228), the processing moves to step 232 so as to discharge the Bull's-eye 80 from the transport path 106. After that, the exposure operation for conditioning is ended.

When the exposure conditions of the printer section 10A are set using the photographic prints obtained in the above-described manner, standard exposure conditions are first set on the basis of the print obtained from the standard exposure frames 88N such that the density in each of R, G and B and the color balance becomes proper. In detail, the amount of compensation by the filter 24, exposure time, and the like are set such that exposure amounts for Y, M and C become the same when the negative film 16 is subjected to exposure. Further, a so-called slope compensation is performed using prints obtained from the underexposure frame 88U, the overexposure frame 88O, and the ultra overexposure frame 88Oo. In detail, compensation values corresponding to different image densities are set using these prints such that the densities of R, G and B and the balance become equal to those obtained through exposure under the standard exposure conditions, regardless of the density of each image. With this operation, the images recorded on the negative film 16 can be printed onto the negative film 38 such that they have constant finish quality regardless of their densities.

The setting of the exposure conditions may be performed based on the magnetic information recorded on the magnetic tracks 92 other than performed based on the results of the measurement using the density sensor 62. In this case, desired exposure conditions are recorded on the magnetic recording layer of the negative film 16, and exposure is performed based on the recorded exposure conditions to provide photographic prints of constant finish quality.

Since the film carrier 18 itself has the function of managing the Bull's-eye 80, the Bull's-eye 80 can be managed properly even when the printer section 10A does not have the function of managing the Bull's-eye 80. This allows the printer processor 10 to produce photographic prints of good quality.

The operation of the film carrier 18 is not limited to that shown by the flowchart of FIG. 7, and for example, the operation for updating magnetic information may be modified as follows. That is, the Bull's-eye 80 is first passed through the film carrier 18 so as to read out magnetic information recorded on the Bull's-eye 80, and updated magnetic information is recorded onto the Bull's-eye 80 when the Bull's-eye 80 is again fed into the film carrier 18 so as to print onto the printing paper 38 the images recorded on the Bull's-eye 80.

The Bull's-eye 80 may be stored in the cartridge 112 by wounding it around the spool shaft 110. This prevents the surface of the Bull's-eye 80 from being damaged due to rubbing during storage and from discoloring due to exposure to external light. Accordingly, the Bull's-eye 80 can be used for a prolonged period of time.

In the case where the Bull's-eye 80 is contained within the cartridge 112 for storage as described above, the cartridge 112 containing the Bull's-eye 80 is loaded onto the cartridge loading section 102, as in the case of ordinary negative film 16, and the Bull's-eye 80 is pulled out of the cartridge 112.

In the present embodiment, the carrier controller 144 is provided in the film carrier 18 so as to perform various kinds of operations, such as transport of the negative film 16, and read/write of magnetic information. However, it is possible to modify the printer controller 146 of the printer section 10A so that it has such a function performed by the carrier controller 144, thereby controlling the operation of the film carrier 18.

As described above, in the printer control film according to the present invention, information regarding use can be recorded in the magnetic recording regions together with information regarding images. This information regarding use makes it possible to grasp a photographic printer to be used, the usable time limit, etc. Accordingly, it becomes possible to properly set exposure conditions, thereby making it possible to produce photographic prints of proper quality through exposure.

What is claimed is:

1. A printer control film used for setting exposure conditions during exposure a for printing onto a printing paper images of a photographic film loaded onto a film carrier of a photographic printer, said printer control film comprising:

an image recording region in which an image is recorded which has been formed through exposure under predetermined exposure conditions;

a perforation indicating the position of the image in said image recording region; and a magnetic recording region into which are recorded at least information specifying a photographic printer for which said film is used, and information regarding use, including a start time of use and the number of times of use, as well as exposure conditions for said image.

2. A printer control film according to claim 1, wherein said image recording region includes an underexposure frame, a standard exposure frame, an overexposure frame, and an ultra overexposure frame, as well as an unexposed base frame, said underexposure frame, said standard exposure frame, said overexposure frame, and said ultra overexposure frame being formed by photographing a circular image having a predetermined color in the states of underexposure, standard exposure, overexposure and ultra overexposure, respectively.

3. A printer control film according to claim 2, wherein said predetermined color is gray.

4. A printer control film according to claim 1, wherein a leader portion and a tail portion having a plurality of engagement holes are formed such that they sandwich said image recording region.

5. A printer control film according to claim 1, wherein said magnetic recording region includes longitudinally extending magnetic tracks formed at each transverse direction end of said printer control film.

6. A printer control film according to claim 1, wherein said magnetic recording region is formed by applying a transparent magnetic recording layer over substantially an entire area of one face of said printer control film, and only predetermined regions of a transparent magnetic recording layer are used as said magnetic recording region.

7. A printer control film according to claim 1, wherein said printer control film is a Bull's-eye.

\* \* \* \* \*